Jan. 25, 1966  C. C. BARBER  3,230,629
OPTICAL DEVICE FOR CHECKING ACCURACY OF SHAPE
Filed Dec. 3, 1959  2 Sheets-Sheet 1

FIG. I

*Inventor*
CLIFFORD CHARLES BARBER
*By*
*Attorney*

Jan. 25, 1966  C. C. BARBER  3,230,629
OPTICAL DEVICE FOR CHECKING ACCURACY OF SHAPE
Filed Dec. 3, 1959  2 Sheets-Sheet 2

Inventor
CLIFFORD CHARLES BARBER
By
Larson and Taylor
Attorney

United States Patent Office 3,230,629
Patented Jan. 25, 1966

3,230,629
OPTICAL DEVICE FOR CHECKING ACCURACY OF SHAPE
Clifford Charles Barber, Chingford, London, England, assignor to National Research Development Corporation, London, England, a British company
Filed Dec. 3, 1959, Ser. No. 857,144
10 Claims. (Cl. 33—174)

This invention relates to optical apparatus for comparing the profile of a workpiece with a selected profile.

The invention is applied to apparatus including a carriage constrained to move in a straight line, upon which carriage is mounted a table so as to be movable at right angles to the movement of the carriage, in order that the table can execute rectilinear co-ordinate movement, and a feeler connected to this table so as to be capable of tracking the selected profile and moving the table in relation to a fixed point at the intersection of a perpendicular axis with the table, to produce a trace upon the table which is at least virtually a locus of said point and represents the path of this tracking.

An object of the invention is to provide improvements whereby a copy of the trace just mentioned will be reproduced at a separate location during the tracking of the selected profile, and whereby a further trace will also be produced at the said separate location during the tracking of the article the profile of which is to be tested, so that lateral displacement between corresponding points upon the said copy and further trace will represent discrepancy between corresponding points of the selected profile and the profile under test. A further object of the invention is to provide angularly movable index means disposed upon an axis which will intersect the said corresponding points, irrespective of whether these points are upon straight, curved or inclined parts of the traces.

Another object of the invention is to provide means whereby the said copy and further trace can be photographically produced at the said separate location.

A still further object of the invention is to provide means whereby any displacement between the said copy and further trace representing discrepancy between the standard profile and the profile under test will be optically magnified.

According to the present invention, motion due to the tracking is transmitted to cause relative movement between the index means and the separate location so that at any instant during tracking, the appropriate dimensional difference, as it is presented, will be indicated by the said index means. This indexing may be effected by producing the relative movement between a slit masking plate and the location so that the slit will span each of the said dimensional differences, as it is presented.

Various references hereinbefore, to arrangements for mounting a movable feeler scanning a fixed workpiece, will be understood to be applicable also to the mounting of a movable workpiece in contact with a fixed feeler.

The invention will now be described, by way of example, with reference to the accompanying drawings, of which:

Figure 1:
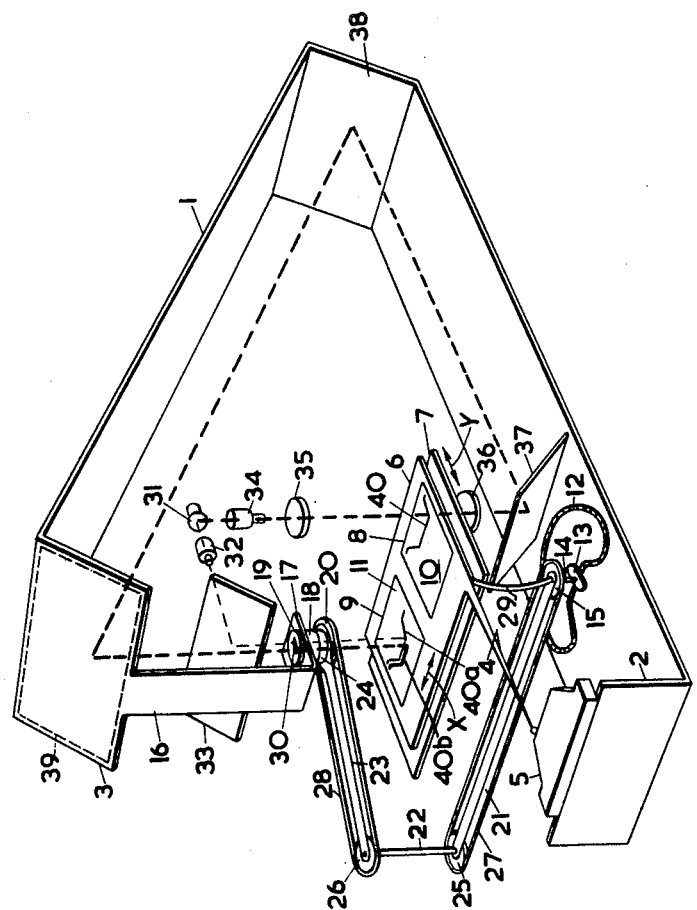
FIG. 1 is a diagrammatic view of apparatus for carrying out the invention by exposure upon a photographic plate, in which this and the original trace are moved in accordance with the tracking movement over the workpiece.

The apparatus shown in FIG. 1 comprises a frame 1, of substantially truncated triangular shape, one limb of which is horizontally disposed and constitutes the base of this frame and is provided at its forward or outer end with an upturned portion 2 disposed at right angles to this limb, and the other or upper limb of this frame is provided at its forward or outer end with a downwardly inclined portion 3 disposed at a right-angle to this upper limb.

A feeler 4 is provided, the forward spherical end of which is shown tracking a workpiece 5, and which feeler is carried by a table 6 mounted by means of suitable guides (not shown) upon a second table 7, so as to be capable of moving thereon transversely of the apparatus, as indicated by the arrow X, whilst the table 7 is in turn similarly mounted to move longitudinally of the apparatus, as shown by the arrow Y, upon a fixed table, which, for the sake of clarity, has been omitted from the drawing.

Formed in the table 6 are rebated rectangular openings 8, 9, the opening 8 being adapted to carry a transparent slide 10, and the opening 9 being adapted to carry a photographic plate 11. A large rectangular opening (not shown) is formed in the table 7, so that the opening 8 shall not be obscured.

Formed in the upper surface of the base portion of the frame 1 in a track 12 which forms a closed loop, and the shape of the forward parts of which track correspond in shape with the profile of the workpiece 5. Arranged to travel around this track 12, but not to rotate therein, is a shuttle 13 carrying a vertical spindle 14, fixed upon the upper part of which spindle is a sprocket wheel 15.

Formed integral with the middle of the lower edge of the aforesaid downwardly inclined portion 3 of the upper limb of the frame 1 and depending from this edge is a vertical bracket 16, the lower part of which bracket has a rearwardly bent portion 17, which is centrally perforated and has welded or otherwise fixed upon its underside a sleeve 18 which forms a bearing for a second sleeve (not shown) to the upper end of which second sleeve is welded or otherwise attached a disc 19 which is of slightly larger diameter than the perforation in the portion 17 of the bracket 16. The second sleeve is slightly longer than the sleeve 18 and secured around its lower end is a ring 20 which is provided around its outer periphery with teeth (not shown) so that it constitutes a sprocket wheel.

Pivoted upon the upper end of the aforesaid spindle 14 is one end of a link 21 the opposite end of which link is pivoted upon the lower portion of a spindle 22, to the upper end of which spindle 22 is pivoted one end of a link 23 the opposite end of which link 23 carries a sleeve 24 by which it is pivoted upon the sleeve 18. Fixed upon the lower portion of the spindle 22 is a sprocket wheel 25 and fixed upon upper portion of this spindle 22 is a second sprocket wheel, 26. Passing around the sprocket wheels 15 and 25 is an endless driving chain 27, and passing around the sprocket wheels 20 and 26 is a similar driving chain 28.

Fixed between the upper end of the spindle 14 and the table 6 is a bias spring 29 which exercises sufficient loading upon this table to maintain the head of the feeler in contact with the workpiece 5 as the shuttle 13 travels (as a result of the table 6 being pushed laterally of the apparatus) along the part of the track 12 which corresponds to the part of the profile of this workpiece which it is required to track.

Formed in the aforesaid disc 19 is a diametral slit 30. A spot of light from an electric lamp 31 can be focused through a lens 32 onto a semi-silvered mirror 33, carried upon the aforesaid bracket 16, so that this spot of light will pass through the centre of the slit 30 onto the photographic plate 11. A beam of light is also focused from the lamp 31 through a lens 34, so that it passes through a condenser lens 35 and the transparent slide 10, thence through a magnifying lens 36, onto a mirror 37 carried upon the base portion of the frame 1. From the mirror 37 this beam is reflected onto a mirror 38 carried at the inner end of the frame 1, from this mirror 38 onto a mirror 39 carried upon the aforementioned downwardly inclined portion 3 of the frame 1, from which mirror 39 it is again reflected, through the semi silvered mirror 33 and the slit 30, onto the photographic plate 11.

Before the apparatus is used in the actual testing of a workpiece, a nominal workpiece can be placed upon the portion 2 of the frame 1, the transparent slide 10 having been smoked, and a scriber (not shown) placed upon the same axis as the beam of light shown in the drawing as passing through this slide, so that, when the shuttle 13 is moved along the portion of the track 12 corresponding to the profile of this workpiece, a trace 40 will be scribed upon the smoked surface of the slide 10. During this operation, the spot of light passing through the slit 30 will expose upon the photographic plate 11 a facsimile 40a, of the trace scribed upon the slide 10, or alternatively, the nominal workpiece may again be tracked for this purpose. This facsimile constitutes a profile diagram such as hereinbefore described.

After the original trace 40 has been formed upon the slide 10 and the facsimile of this trace has been exposed upon the photograph plate 11, as just described, the nominal workpiece is replaced by the workpiece 5 to be tested, and the feeler 4 caused to track the workpiece 5, by pushing the table 6 across the apparatus, so that the track 12, shuttle 13 and biasing spring 29 will maintain the feeler in correct tracking contact with the workpiece 5. It will, of course, be understood that during this tracking of the workpiece 5, the combined link, sprocket and chain arrangement, hereinbefore described, will cause the slit 30 always to be at right angles to the part of the facsimile 40a of the original trace 40, exposed as aforesaid upon the photographic plate 11, and which part corresponds to the particular part of the workpiece 5 being at any instant tracked by the feeler 4. This will, in turn, cause the intersection of an image of the portion of the original trace, considerably enlarged by the magnifying lens 36, with the slit 30 to take place in such a manner that, during the tracking the workpiece 5, this inter section will cause an image of a part of this trace to be projected onto the photographic plate 11, which will result in a progressive exposure of a line 40b similar to the facsimile of the original trace. This line, however, will have its parts displaced from the corresponding parts of said facsimile by distances which are, to a magnified scale, the differences between the dimensions of the corresponding parts of the workpiece 5 and the selected workpiece from which the original trace was formed.

Figure 2:
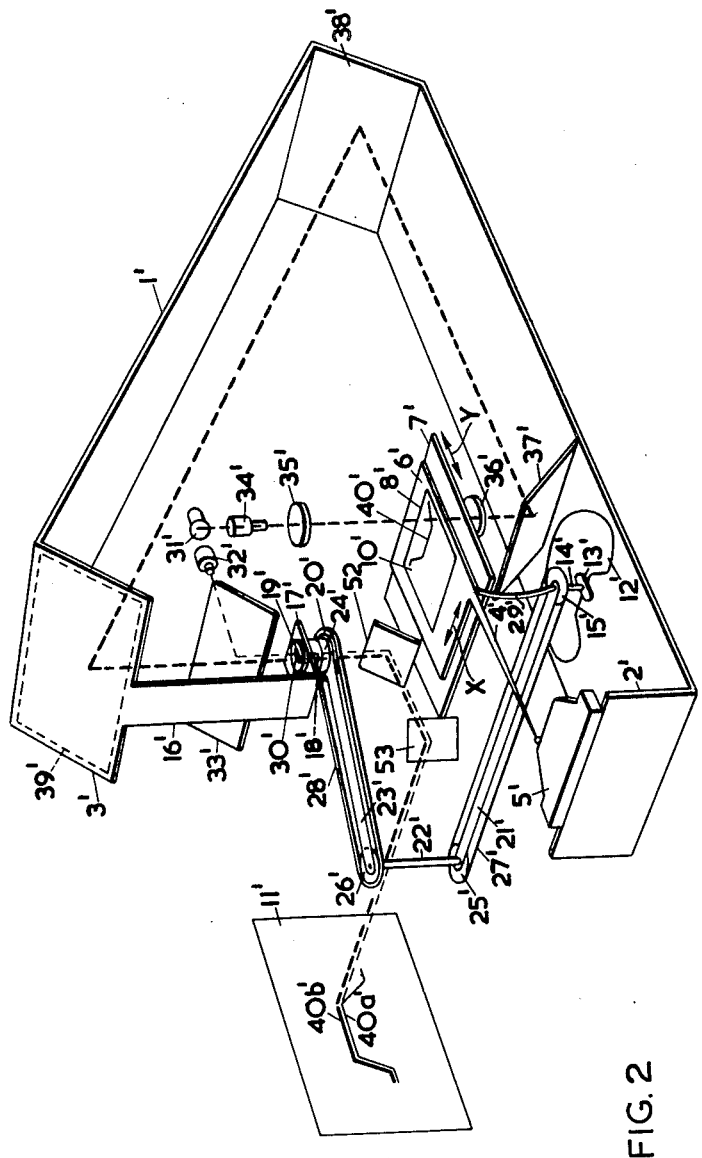
FIG. 2 is a diagrammatic view of an alternative form of apparatus for use with a photographic plate.

In the construction shown in FIG. 2, in which parts corresponding to those shown in FIG. 1 are indicated by similar reference numerals to which have been added the superscript "1," instead of the table, indicated by 6′, carrying a photographic plate, the apparatus can effect exposure upon a stationary photographic plate 11′, arranged in a vertical plane, by causing the spot of light from the lens 32′ to pass onto a mirror 52 carried by the table 7′, from which mirror 52 it will be reflected onto a mirror 53 carried by the table 7′, thence onto the plate 11′. In this arrangement, the mirror 52 is positioned in a plane at 45° to the surface of the table 6′, and the mirror 53 is positioned in a vertical plane inclined at 45° to a vertical plane extending fore and aft of the apparatus.

In the foregoing description with reference to the drawings, there have been described two examples of apparatus according to the invention, in one of which the copy of the original trace and a further trace have been produced upon a movable surface, and, in the other, these two traces have been produced upon a fixed surface.

Assuming that there is a dimensional difference of 0.001 inch between a part of the workpiece and a corresponding part of the selected profile, and that the optical magnification employed is 500, then the displacement between the corresponding points of the said copy and further trace will not, in fact, be exactly 0.5 inch, but will differ from this by the magnified error of displacement of 0.001 inch, which difference will, in view of the comparatively coarse method of measurement permitted by the large magnification factor, not be distinguishable or necessary to take into account, by reason of the fact that, if it should be divided by 500 it would only amount to $2 \times 10^{-6}$.

The original trace should of course be made as fine as possible so that, after the necessary magnification has taken place, the apparent thickness of the second trace exposed upon the screen will be small in comparison, for example, with displacement between it and the reference trace representing, substantially to the same magnification, differences within tolerance limits between parts of the workpiece and the selected profile.

While the above description represents preferred embodiments of my invention, it is of course understood that variations may be resorted to without departing from the spirit of my invention and the scope of the subjoined claims.

Instead of the apparatus described with reference to FIG. 1 being used for the photographic method, it may, with slight modification, be used for carrying out the method hereinbefore described, in which the profile diagram constitutes a drawing. In order to do this, the part of the table 6 which has been described as carrying a photographic plate would constitute or carry a screen on which is produced or placed a drawing of a profile diagram past which is caused to weave an image of the magnified portion of the original trace. This can be effected after removing the bracket 16, together with the mirror 33 and the slit disc 19, and the other associated parts carried by this bracket, also the lens 32, and removing, but preferably altering the link, sprocket and chain system which rotates the disc 19, as previously described, to operate, in a similar manner a frame (not shown) carrying a cursor wire across the screen. The arrangement would be such that at any instant during the tracking of a workpiece the cursor wire would, if employed, lie at right angles to the particular part of the profile corresponding to the particular part of the workpiece being tracked at that particular instant and intersect the corresponding point of the magnified trace portion. By making substantially the same alterations, as just described, to the apparatus shown in FIGURE 2 it is possible to carry out the same method on that apparatus, a similar cursor arrangement preferably being included.

I claim:

1. In apparatus for comparing the profile of an article with a selected profile, the combination comprising a frame; a movable table having a marking surface; means mounting said table for rectilinear co-ordinate movement of the table relative to said frame; means for mounting a selected profile in a predetermined position on the frame; a feeler fixed to the table and having means engaging and tracking the selected profile upon movement of the table and feeler; means at the intersection of the marking surface with an axis perpendicular to said table and removably fixed with respect to the frame for marking a trace on the marking surface corresponding to the selected profile, during tracking of said selected profile; a marking plate at a location separate from the marking surface, and co-ordinated means for forming a corresponding facsimile of the trace on the marking plate simultaneously with the marking of said trace; means for forming a transmitted trace on the marking plate upon engagement and tracking by said feeler of the profile of an article mounted in the said predetermined position on the frame, such that lateral displacement between corresponding points of the facsimile and the transmitted trace represents discrepancy between the corresponding points of the selected profile and the article; angularly movable index means disposed upon an axis intersecting both the facsimile and the transmitted trace; and means interposed between the index means and feeler to position the index means such that at any instant during the tracking of the profile of the article, the points of intersection of the axis of said index means with the said facsimile and transmitted trace will be the corresponding points of the selected profile and the article.

2. Apparatus according to claim 1 wherein the marking plate includes a photosensitive surface, and the co-ordinated means for forming the facsimile and the means for forming the transmitted trace each include means for directing a beam of light onto the said photosensitive surface.

3. Apparatus according to claim 2 wherein the beams of light are stationary, and the marking plate and photosensitive surface are mounted on the table for co-ordinate movement therewith, the facsimile and transmitted trace being produced by movement of the photosensitive surface beneath the beam of light.

4. Apparatus according to claim 2 wherein the marking plate and photosensitive surface are fixed with respect to said frame, and further comprising means mounted on the table for movably directing the beams of light against the photosensitive surface upon movement of the table to form the facsimile and the transmitted trace.

5. In apparatus for comparing the profile of an article with a selected profile, the combination comprising a frame; a movable table having a marking surface; means mounting said table for rectilinear co-ordinate movement of the table relative to said frame; means for mounting a selected profile on the frame; a feeler fixed to the table and having means for tracking the selected profile upon movement of the table and feeler; means at the intersection of a perpendicular axis with the table for producing a trace upon the table representing the path of said tracking; a masking plate have a fine straight slit and mounted for rotation in its own plane about a fixed axis; a photosensitive surface at a location remote from said marking surface; optical means for projecting a point of light through the slit and onto the photosensitive surface to form a facsimile of said trace simultaneously with the production of the trace; optical magnifying means for projecting an image of at least part of the trace through the slit of the masking plate and onto the photosensitive surface to produce a further trace during the tracking by the feeler of the profile of an article mounted in the place of the selected profile; a shuttle connected to the table; guide means for constraining movement of the shuttle to a path substantially the same as the contour of the selected profile to maintain contact between the feeler and selected profile; and means for transmitting angular movement of the shuttle as it moves along the guide to the masking plate to simultaneously represent the corresponding points of the facsimile and further trace by the slit of said masking plate, the slit thereby constituting an index indicating the corresponding points and the extent of apparent displacement of said points along the slit representing the degree of discrepancy between corresponding parts of the selected profile and the profile of the article.

6. Apparatus according to claim 5 wherein the means for transmitting the angular movement of the shuttle comprises a first link one end of which is pivotably connected upon the axis of rotation of the masking plate; a second link one end of which is pivotably connected to the middle of the shuttle; a spindle pivotably joining the first and second links at their respective other ends; a first sprocket fixed to the middle of the shuttle; a second sprocket fixed to the spindle; an endless driving chain passing around the first and second sprockets for transmitting angular movement of the shuttle through the first sprocket to the second sprocket and spindle; a third sprocket fixed to the spindle for pivotable movement therewith; a fourth sprocket coaxial with and fixed to the masking plate; and a second endless chain passing around the third and fourth sprockets to further transmit the movement to the masking plate.

7. Apparatus according to claim 6 and further comprising a spring connecting means between the shuttle and table for producing a bias against the table to ensure contact between the feeler and profile.

8. Apparatus according to claim 5 wherein the photosensitive surface is mounted on the table or corresponding movement therewith.

9. Apparatus according to claim 5 wherein the photosensitive surface is fixed with respect to said frame, and further comprising a mirror system mounted on the table for movably directing the beam of light from the optical means and the projected image from the magnifying means onto the fixed photosensitive surface.

10. Apparatus according to claim 1 wherein the angularly movable index means is disposed on a fixed axis with respect to said frame; and the means to position the index means comprises a shuttle connected to the table; a track fixed to the frame for constraining movement of the shuttle and table to a path substantially the same as a contour of the selected article; spring connecting means between the shuttle and table applying a bias to the table to ensure contact between the feeler and profile; and link and chain driving means for transmitting any angular movement of the shuttle as it moves along the track directly to the masking plate for corresponding angular movement.

References Cited by the Examiner
UNITED STATES PATENTS

| 2,451,155 | 10/1948 | DeBoer | 33—174 X |
| 2,621,556 | 12/1952 | Beardsley | 33—174 X |
| 2,707,321 | 5/1955 | Breisch | 33—174 |
| 2,799,206 | 7/1957 | Fuller | 33—174 X |

LOUIS R. PRINCE, *Primary Examiner.*

LEONARD FORMAN, ISAAC LISANN, *Examiners.*